Nov. 17, 1931.    W. NOBLE    1,831,820
OVEN AND BURNER
Filed May 27, 1929    2 Sheets-Sheet 1

Inventor
Warren Noble.

By
Attorney

Nov. 17, 1931.  W. NOBLE  1,831,820
OVEN AND BURNER
Filed May 27, 1929   2 Sheets-Sheet 2

Warren Noble.
INVENTOR
BY Stanley Lightfoot
ATTORNEY

Patented Nov. 17, 1931

1,831,820

UNITED STATES PATENT OFFICE

WARREN NOBLE, OF DETROIT, MICHIGAN

OVEN AND BURNER

Application filed May 27, 1929. Serial No. 366,315.

This invention relates to oven burners of a type more particularly adapted for use in domestic cooking ovens, and to the combination of such a burner with an oven in such relationship that highly satisfactory results in quality and efficiency of cooking may be obtained and the oven adapted to the cooking of an extensive variety of dishes without requiring a duplication of burners and with marked economy.

An object of the invention is to provide a heating element which will by its particular structure have the inherent quality of promoting convection in an oven to a high degree and afford an evenness of heat distribution throughout the oven which will lend itself to thorough and even cooking of dishes placed within the oven for that purpose. It as been found by actual practice that the materially different conditions attending the broiling of steaks and fish, the roasting of meats, the baking of vegetables, and the baking of cakes and biscuits may be all readily met in an oven equipped with the type of burner hereinafter described, and the cooking of such articles effected in a generally more satisfactory manner than in ovens as heretofore equipped, so that an oven having a burner of the improved type also lends itself to better cooking by inexperienced operators mainly due to its better heat distribution.

A further object of the said invention is to provide an oven burner characterized by its open structure whereby air may flow readily therethrough with heating elements directly heating the air passing through the burner, and heat collecting members receiving heat by radiation from the elements and reradiating the heat to the air for the further promotion of convection currents to the burner. More particularly the invention contemplates the provision in a substantially open electric oven burner of a series of more or less parallel heating elements and a series of members substantially parallel to said elements and adapted to be heated by radiation from the elements, said elements and said members being exposed to the path of air passing through the burner.

It is also an object of the invention to provide in combination with an electric cooking oven an open burner horizontally partitioning the oven to provide cooking compartments thereabove and therebelow and to promote air convection between the compartments throughout substantially the entire area of the burner; and more particularly to employ in such combination a burner having heat collecting means arranged in heat receiving relation to the heating elements of the burner and arranged in the air path through the burner whereby both the elements and burner are exposed to convection currents within the oven.

Still further it is an object to provide, in the oven burner, partitions forming flues between the heating elements whereby the walls of the flues are heated by said elements; and these partitions are preferably of such construction and strength that they may be utilized as supports for cooking utensils within the oven. It is also proposed to utilize the partitions as spacing means for the support of the heating elements of the burner within the frame of the burner.

An object of the invention is also to provide a very convenient structural assembly in the burner whereby it may be manufactured mainly from strips of metal of quite light weight without sacrificing general strength, beauty of appearance or efficiency of operation.

Still further objects are to provide a frame for support of the coils which will permit of minimum amount of wiring being used to connect the various coils together and to terminals and which will likewise, by its construction, provide a guard for the wiring; and to provide two positions for the burner within the oven, and an attachment or plug for insertion into a socket in the back of the oven, the plug being so formed as to be capable of fitting into the one socket regardless of the position assumed by the burner.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may adopt the novel construction and arrangement of parts hereinafter described, by way of example, having reference to the accompanying drawings, wherein.

Similar characters of reference indicate similar parts in the several figures of the drawings.

The burner is shown as comprising a rectangular frame 1 having inwardly flanged upper and lower edge portions 2, and arranged transversely of this frame and adjacent the ends thereof are two parallel strips 3. Extending between these two strips and lengthwise of the burner are a series of parallel partitions 4, connected to the said strips in any suitable manner not shown in detail as the methods of making such connections are so well known.

Figure 1:
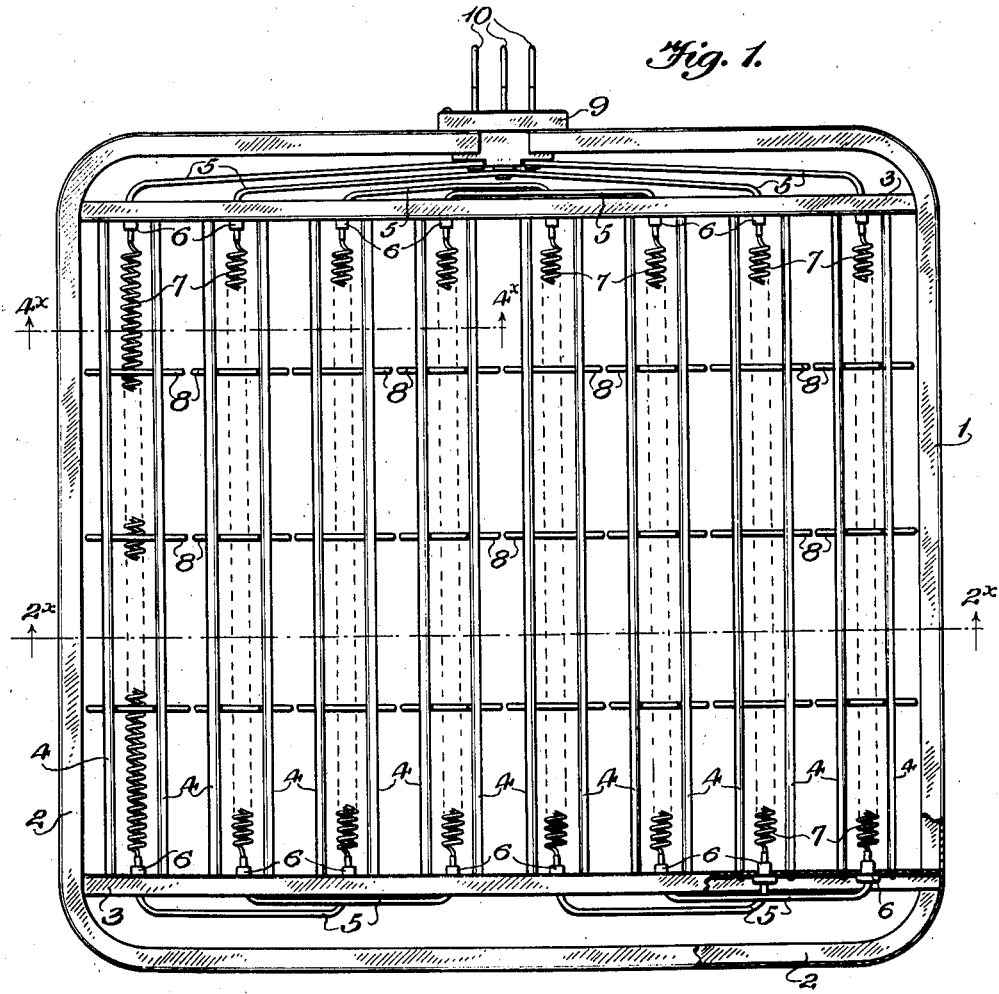
Figure 1 is a plan, partly broken away and in section, illustrating a burner embodying the said improvements.
Figure 2:
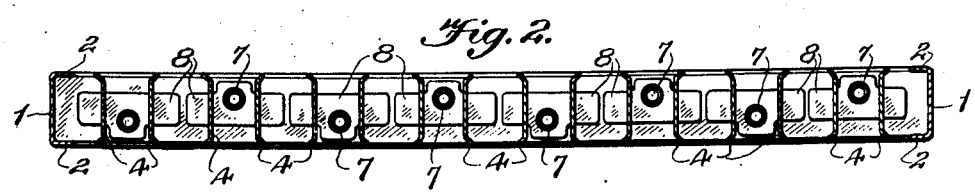
Figure 2 is a transverse section of the same taken on the line 2×—2× of Figure 1.

The transverse strips 3 carry wiring connections 5, the extremities of which project through suitable insulators 6 mounted in the said strips and to these extremities of the wiring connections heating elements in the form of coils 7 are secured to form a wired heating element assembly within the burner structure, as will be readily apparent. The said heating elements lie between and parallel to certain of the said partitions 4 and are supported intermediate of their lengths by transverse insulators 8 which are shaped to form spacers extending between and mounted in the said partitions, as shown in Figures 1 and 2. These insulators 8 maintain the parallel relationship of the heating elements to the partitions and also support the said elements against sagging.

It will be obvious that the arrangement described provides an extremely open structure and a burner having, as a whole, quite low specific heat, so that there is comparatively very little heat absorption in the burner structure itself. Consequently, electric energy supplied to the heating elements readily manifests itself in the radiation of heat both upwardly and downwardly from the burner. The partitions, however, are intended to interrupt some of this radiated heat and become thereby heated, so that they may in turn transmit this absorbed heat to air passing over their surfaces and such passage of air is facilitated and promoted by the flue-like arrangement of the spacing of the partitions.

The heating elements are not necessarily interposed in every space between the partitions, although they may be so if thought necessary or desirable, but it has been found very satisfactory to arrange them in only some of the spaces, for instance, in every alternate space as shown in the drawings, the spaces not so provided with heating elements having heated walls in the form of the partitions and forming flues therebetween.

It is a fact that radiated heat is not highly effective in the heating of gases, such as air, in the same manner as contact of such gases with a heated surface inducing convection will effect the rapid heating of such gases, especially within a closed container such as an oven. Therefore, the described arrangement lends itself excellently to oven heating as it promotes a series of convection currents and turbulence within the air of the oven, resulting in rapid and even distribution of heat throughout the atmosphere of the oven; and this manifests itself in the ability of an oven so equipped to reach a very high temperature in a short space of time, and, in cooking, to obtain a high degree of efficiency and quality as is extremely desirable.

For the sake of permitting the wiring connections 5 to extend directly from one connection to another without crossing or bending to irregular forms the axes of alternate coils may be arranged in different planes as shown in Figure 2 and, with the form of transverse insulators 8 shown, this may be simply accomplished by inserting the insulators with their coil-receiving orifices disposed towards the top or the bottom of the burner as the case may be.

The upper and lower edges of the partitions 4 may be slightly offset or flanged as shown for the purpose of adding rigidity thereto, although this may be accomplished by corrugating or any other suitable manner, and it will be obvious that these partitions will serve as a grid for the support of cooking utensils or other articles directly on the burner, if so desired.

The end walls of the frame 1 extending parallel and comparatively close to the transverse strips 3 form, with the said strips, compartments for the housing and protection of the wiring connections 5.

Figure 3:
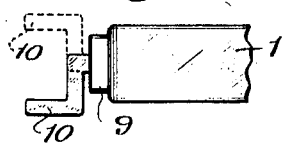
Figure 3 is a fragmentary detail side view of one end of the burner showing the offset terminal arrangement.
Figure 4:
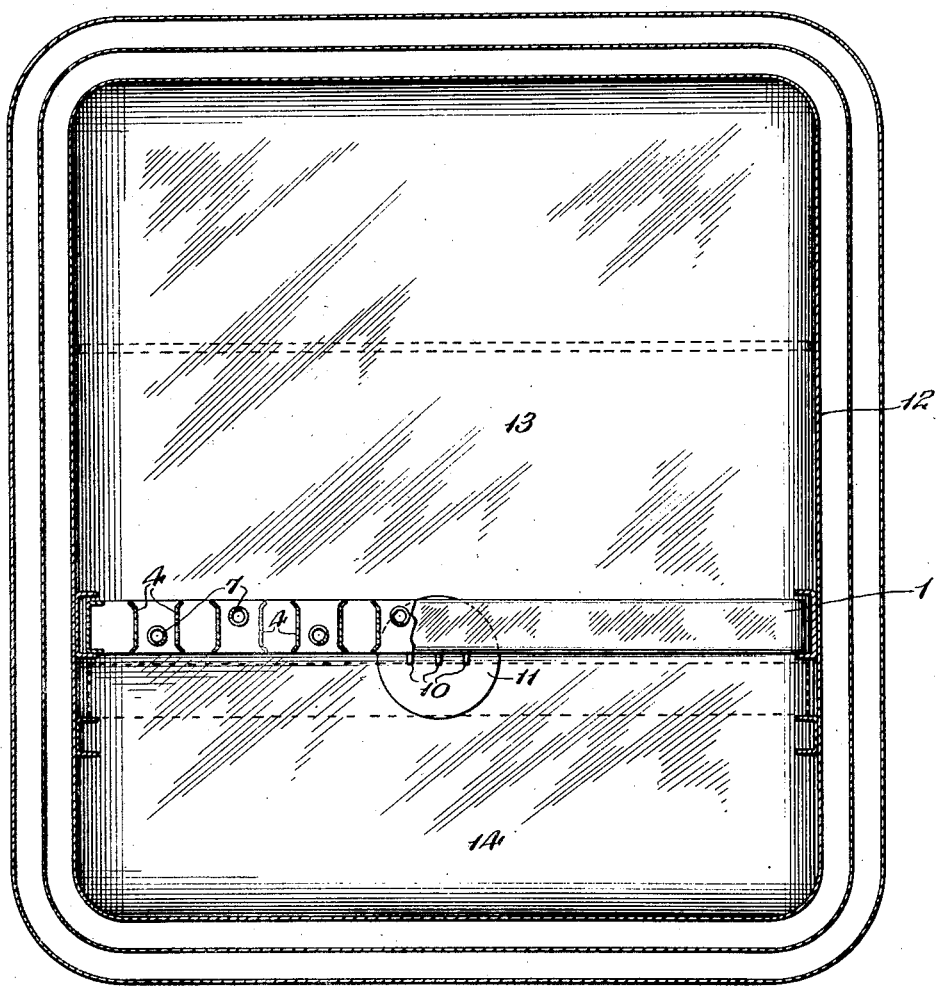
Figure 4 is a vertical transverse section of an oven having such a burner incorporated therein to provide upper and lower compartments in the oven, both heated by the said burner and adapted to free air convection therebetween.

9 is a plug in one of the end walls of the burner frame and has mounted therein terminals 10 adapted to enter a suitable receptacle 11 in the back of the oven with which the burner may be used. These terminals may be cranked or offset from their normal plane, so that upon reversal of the burner, the extremities of the terminals will be below the medial plane of the burner, or thereabove, as the case may be, and as is illustrated in full and in dotted lines respectively in Figure 3. Thus in an oven, such as shown in Figure 4, the burner may be capable of being inserted in either the full line or dotted line position shown in the said figure, while the terminals 10 will still enter the same receptacle 11. This provides a simple adjustment of the burner where it is desired.

Referring more particularly to the said Figure 4, the oven 12 is shown as being divided by the burner into upper and lower compartments 13 and 14, respectively, which due to the open nature of the burner are open to convection currents therebetween, these convection currents being promoted both by the direct heat of the elements 7 and the heat of the partitions 4, as well as the flue action of the said partitions.

It is preferred that the internal surfaces of the oven be plated for reflective purposes, so that such reflected heat will be directed against articles being cooked in the oven, and also so that the reflecting nature of such surfaces will reduce escape of the heat through the walls of the oven. The partitions and other parts of the burner may also be polished for the sake of cleanliness and also, in the case of broiling underneath the burner, to provide for a certain reflection of heat from the partitions towards the article being broiled. It is preferred that the provision of the polished surface be secured by means of chromium or similar plating having highly refractory properties whereby the reflecting nature of the surfaces will not be destroyed by the heat of the burner.

This invention may be developed within the scope of the following claim without departing from the essential features of the said invention, and it is so desired that the specification and drawings be read as being merely illustrative, and not in a limited sense, except as necessitated by the prior art.

What I claim is:

In combination with an oven, an oven lining and a burner comprising a frame and heating elements carried thereby, an offset plug to which said elements are connected, a socket for said plug supported in said lining, and a plurality of pairs of supports carried by said lining for maintaining said burner in suspended relation with the top and bottom of said oven, said burner when supported by certain of said pairs of supports alining said plug with said socket, said burner when inverted and placed in the other of said pairs of supports also alining said plug with the same socket whereby one socket suffices for a plurality of positions of the said burner.

In testimony whereof I affix my signature.

WARREN NOBLE.